（12） United States Patent
Wilson

(10) Patent No.: US 6,895,062 B1
(45) Date of Patent: May 17, 2005

(54) HIGH SPEED SERIAL INTERFACE

(75) Inventor: Thomas J. Wilson, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 09/275,496

(22) Filed: Mar. 24, 1999

(51) Int. Cl.[7] ............................................. H04L 7/00

(52) U.S. Cl. ...................... 375/355; 375/316; 375/354

(58) Field of Search ................................ 375/316, 354, 375/355, 357, 359, 365, 368, 376, 371, 373

(56) References Cited

U.S. PATENT DOCUMENTS 4,365,330 A * 12/1982 Chopping et al. .......... 370/370
5,509,037 A * 4/1996 Buckner et al. ............ 327/152

* cited by examiner

*Primary Examiner*—Mohammed Ghayour
*Assistant Examiner*—Pankaj Kumar
(74) *Attorney, Agent, or Firm*—Schmeiser, Olsen & Watts; Anthony Canale

(57) ABSTRACT

A high speed serial interface system that compensates for phase drift by over sampling received data packets. The system utilizes a transmitter and receiver that operate within the same clock domain to achieve a frequency lock between the two devices. The receiver receives and samples each data packet at n phase intervals, stores and analyzes the samples to determine phase drift, and resynchronizes the receiver clock to compensate for phase drift on an ongoing basis.

22 Claims, 5 Drawing Sheets

*40*

| (i) | (ii) | (iii) | (iv) | n |
|-----|------|-------|------|---|
| B'  | C'   | D'    | E'   | 0 |
| B'  | C'   | D'    | E'   | 1 |
| B'  | C'   | D'    | E'   | 2 |
| B'  | C'   | D'    | E'   | 3 |
| B'  | C'   | D'    | E'   | 4 |
| C'  | D'   | E'    | F'   | 5 |

*FIG. 6*

HIGH SPEED SERIAL INTERFACE

BACKGROUND OF THE INVENTION

1. Technical Field

The present invention relates to high speed digital communication systems, and more specifically to a high speed serial interface for ASIC to ASIC data transmissions.

2. Background Art

In high speed digital systems, it is often necessary to send digital information between discrete Integrated Circuit (IC) packages. Often, this issue becomes the critical bottleneck in overall system performance. This is readily apparent when considering communications systems where the overall throughput of the system (also referred to as the bandwidth of the system) is a fundamental limitation in determining how successfully the system can perform its intended application. One solution for increasing bandwidth is to design systems with more input/output (I/O) hardware to increase throughput. However, increasing the hardware requirements has a direct impact on cost in that the lower the overall bandwidth of a given IC package, the more IC packages become necessary to fulfill the total bandwidth requirement for this system. Thus, a preferred solution is to provide IC's with a greater package I/O bandwidth.

Unfortunately, there is a limit on the available bandwidth of any given IC package I/O due to the fact that as data transfer rates (i.e. frequency) between IC's increase, the reliably of the transferred data decreases. Reliability becomes particularly problematic in high speed transfers where a predictable phase relationship between the transmitted data, the received data, and the clocks on both the transmit and receive sides must be maintained in order to provide a synchronous timebase for the two discrete packages.

With older process technologies, it was fortunate that the package I/O bandwidth was typically greater than the computational bandwidth, i.e., the inherent bandwidth limitations imposed by the operating performance of the process technology. Typical I/O bandwidths approaching 50 million bits per second (Mbs) per package pin were achievable, and were adequate to handle the slower computational bandwidths. Unfortunately, today's modem sub-micron process technologies provide internal ASIC (Application Specific Integrated Circuits) operating performance that results in computational bandwidths that far surpass the available package I/O bandwidths required in today's systems. Techniques, such as transmitting data on both edges of the clock, push achievable bandwidths to 200 Mbs per package pin, but are still far from what is desired.

There have been several previous attempts at solving the above problem. The most obvious is to increase the number of package I/O connections. The problem with this solution is that the number of package I/O pins required to result in an I/O bandwidth that can provide adequate package to package bandwidth that will meet the requirements of the internal processing capabilities can lead to a very large pin count, and hence very expensive packages. For the rare application, this may be acceptable, but for most applications this solution is prohibitively expensive. Other related solutions have centered around developing better package and/or ASIC I/O technology that provides a higher per pin package bandwidth. An example of this technology would be Low Voltage Differential Signal (LVDS) I/Os that use, as the name implies, a pair of package pins that switch differentially within a limited peak to peak voltage range. Even though the LVDS I/O requires two package pins per I/O, the currently achievable per package pin bandwidth is 400 Mbs, with 600 Mbs on the near horizon (and 1000 to 1200 Mbs desired within the next couple of years).

The LVDS I/O (and others like it) would seem to solve the package I/O to package I/O bottleneck. However, as the package pin bandwidth is increased, the time duration of each data bit accordingly decreases since the ideal bit time is one half of the transmitting clock period if data is transmitted on both edges of the clock. Therefore, the time it takes for data to travel from one package to the next becomes a critical factor in the realistically achievable per pin bandwidth. Since the data transmitted is synchronous to its clock domain, the receiving ASIC must be able to acquire the data synchronous to the same clock domain and within a predictable phase-time shift in order to reliably retrieve the data without inserting errors or extracting unnecessary information. At high bit rates (>300 Mbs), one of the major issues to contend with then becomes the overall time it takes to transmit data from one ASIC to another since this time can become a significant portion (if not greater than) the ideal duration (in time) of the data bit.

There have also been several attempts at solving this problem of maintaining phase coherence between the data transmitted from one ASIC to the same data received at another ASIC when each ASIC has its own clock domain. One solution is to transmit the clock along with the data from the transmitter ASIC to the receiver ASIC, therefore requiring another pair of package pins for this transmitted clock. This results in an achievable per bit bandwidth half that desired unless multiple data bits are transmitted along with one clock. In this manner, the per pin bandwidth consumed by the LVDS I/O pins used for the clock is averaged over the total per pin bandwidth of the associated data to minimize the adverse effect the clock has on the achievable per package pin bandwidth. The problem with this solution is that tight phase coherence must be maintained over all of the LVDS I/O to LVDS I/O connections for the data and the clock. Maintaining this phase coherence for a significant ratio of data connections to clock connections (e.g., >8) is extremely difficult for high bandwidth transmission (e.g., >500 Mbs per data bit=250 Mbs per package pin) since everything in this connection path must have exactly matched lengths.

Another solution has been to "imbed" the clock in the data stream by guaranteeing enough data transmissions to enable the use of a Phase Locked Loop (PLL) to recover the original clock, and hence the phase of the data received by the receiver ASIC. The problem with this technique is that a unique PLL is required for every data input at the receiver ASIC. Since there is a limitation on the number of PLLs allowed per ASIC (typically around four), this limits the number of connections between the transmitter and receiver ASIC to three (one PLL is typically required for the ASIC system clock.)

Another type of solution is to pass the data received at the receiver ASIC through a delay chain comprised of many delay elements, each having a minimum amount of delay available in the process technology that the receiver ASIC is implemented in. A special sequence of data (called a "training sequence") is transmitted from the transmitter ASIC. As the receiver ASIC receives the training sequence, the output of each delay element is captured into a storage element. By analyzing this captured output the receiver ASIC could pick out the delay element output that establishes a relative phase match that is as close to the center of the data "eye" (i.e., most centered between bit transitions) as possible. This technique has the advantage of eliminating any phase coherency requirements between data inputs at the receiver (since each input is individually phase aligned), but has a couple of significant drawbacks that limit its usefulness.

The first of these is that the capability of canceling out the absolute phase shift of the data is inherently dependent on the delay chain. Since the per element delay in the delay chain will vary over the permissible process, voltage, and temperature range for the ASIC, the ability of the data delay chain to compensate for absolute phase shift will vary as these three factors change. A second problem is that the solution is inherently frequency dependent. Since it is required to store >2 bits of information in the delay chain to facilitate bit transition detections (2 are required), the number of delay elements in the delay chain must be therefore large enough to ensure this even under the conditions which produce the largest per element delay. If a wide range of operational frequency is desired, then the delay chain must be designed to contain these necessary >2 bits at the slowest frequency (where the per bit time is greatest). Once the design is implemented (i.e., fabricated), it cannot be guaranteed to operate at less than the lower limit of the frequency range it was designed for. To provide a reasonably large range of operation, the delay chain must therefore contain a very large number of elements.

Yet a third problem is that this type of implementation has an inherent limitation in its ability to track for transmitter to receiver phase delay drift over time without significantly increasing the number of delay elements. Phase delay drift compensation can only be accomplished by first providing a mechanism for monitoring the movement of data transitions within the delay chain. Subsequent phase delay drift compensation is accomplished by changing the delay element output used to return data to the system (thereby remaining in the center of the data eye). The continued monitoring of phase delay drift requires data transition detection from this new delay element output. Therefore it can be seen that any appreciable amount of phase delay compensation would necessarily result in significantly more delay elements in the data delay chain. Of course, all process, temperature, voltage and frequency issues as discussed above still apply.

SUMMARY OF THE INVENTION

The present invention solves the above-mentioned problems of ASIC-to-ASIC high speed data transmissions by providing: a transmitter and a receiver operating within the same frequency and clock domain; a receiver that can sample data at n phase intervals; a mechanism for synchronizing this data to a common phase interval; a mechanism for analyzing this synchronized data and subsequently determining one of the n phase intervals to be a best fit or preferred interval for sampling the data with the remaining clock intervals identified as neighboring intervals for sampling this same data; a mechanism for reconstructing n data packets from the synchronized data that represent n data packets sampled at the n phase intervals; and a mechanism for comparing the data packet sampled at the preferred interval with the data packet sampled at each of the neighboring intervals and subsequently analyzing the results of these comparisons. The system may further comprise a mechanism for storing a history of the synchronized data, using the results of the comparison analysis to determine transmitter to receiver phase delay drift, and a mechanism for compensating for the identified phase delay drift.

Both the transmitter and receiver may rely on phase lock loop (PLL) devices to receive a common system clock and provide a common clock signal to both the transmitter and receiver. As such, both the transmitter and receiver will be frequency locked thereby guaranteeing that each data bit, and therefore each data packet, is received at the same frequency that it is being sent. Phase locking is then achieved by analyzing the received, over sampling data packets to identify which sampling clock is best suited to sampling the data equidistant from data transitions. In this manner, the absolute phase delay from transmitter to receiver is cancelled out and the receiver is accordingly phase locked to the incoming data stream. Once phase lock is established, as long as the data packet size remains the same as that used for the training sequence, subsequent transmitter data packets can be reliably extracted from the data stream every data packet interval since the transmitter and receiver ASICs are frequency locked. By further using the results of the comparisons of the data packets derived from the neighboring sample intervals with that from the best fit sampling interval, transmitter to receiver phase delay drift can be identified, enabling the appropriate compensation. By only analyzing fully reconstructed data packets (as opposed to individual data bits), short term noise effects on any individual data bit (or bits) will not affect the process of choosing the best fit sampling interval. Note that this technique can be applied independently to each transmitter to receiver link in a system, and that subsequently there is no inherent matching requirement in the transmitter to receiver phase delay across multiple links.

It is therefore an advantage of the present invention to provide a high speed serial interface that provides accurate frequency and phase locking between transmitted and received data.

It is therefore a further advantage of the present invention to allow data to be transmitted on each edge of a clock to maximize throughput.

It is therefore a further advantage of the present invention to provide multiple parallel data paths to acquire data at discrete and predictable phase intervals.

It is therefore a further advantage of the present invention to analyze received data by performing distributed comparisons on reconstructed data packets from each of the parallel data paths.

It is therefore a further advantage of the present invention to phase lock the received data stream to the receiver clock as a result of distributed data comparisons.

It is therefore a further advantage of the present invention to provide a mechanism for compensating for transmitter to receiver phase delay drift over time.

It is therefore a further advantage of the present invention in that phase locking and subsequent phase delay drift compensation is completely contained with the synchronous system clock domain.

It is therefore a further advantage of the present invention to filter out the effect of short term noise on an individual bit (or bits) from affecting a best fit sampling interval.

It is therefore a further advantage of the present invention to allow multiple transmitter to receiver connections to be used with the same receiver clock(s), thereby reducing the number of PLLs required for the receiver ASIC to one.

It is therefore a further advantage of the present invention to allow each transmitter to receiver connection to have a different phase delay, thereby removing any inherent restriction on matching phase delays across multiple connections.

It is therefore a further advantage of the present invention to provide a high speed serial interface that can facilitate phase locking a received data stream to a receiver clock independent of process, voltage, temperature, or frequency.

It is therefore a further advantage of the present invention to provide a high speed serial interface that can compensate for transmitter to receiver phase delay drift independent of process, voltage, temperature, or frequency.

BRIEF DESCRIPTION OF THE DRAWINGS

These and other features and advantages of this invention will be more readily understood from the following detailed description of the various aspects of the invention taken in conjunction with the accompanying drawings in which:

FIG. 6 depicts the contents of a history buffer subsequent to the one depicted in FIG. 5 in accordance with a preferred embodiment of the present invention.

DETAILED DESCRIPTION OF THE PREFERRED EMBODIMENTS

I. Overview

This invention is intended to address the high speed ASIC to ASIC serial data transmission problem as discussed above. An objective objective in developing this architecture is to maximize the realizable bit rate per package I/O, while minimizing the number of PLLs required per ASIC. Other secondary objectives are to: (1) maintain a high degree of tolerance of receiver clock to data jitter, and data pulse width variations; (2) eliminate any inherent requirement to balance link to link transmitter to receiver phase delays in a multiple link implementation; (3) provide a means to compensate for transmitter to receiver phase delay drift over time; and (4) develop a design whose transmission rate is only bounded by the upper end at which the process technology can operate, having no other inherent process, voltage, temperature, or frequency limitations. There are many challenges to accomplishing the above goals. However, the basic problem in achieving the goal of highest possible bit rate per package I/O can be summarized as how to reliably recover data that has been transmitted relative to one clock domain into the receiver's (distinct) clock domain.

Figure 1:
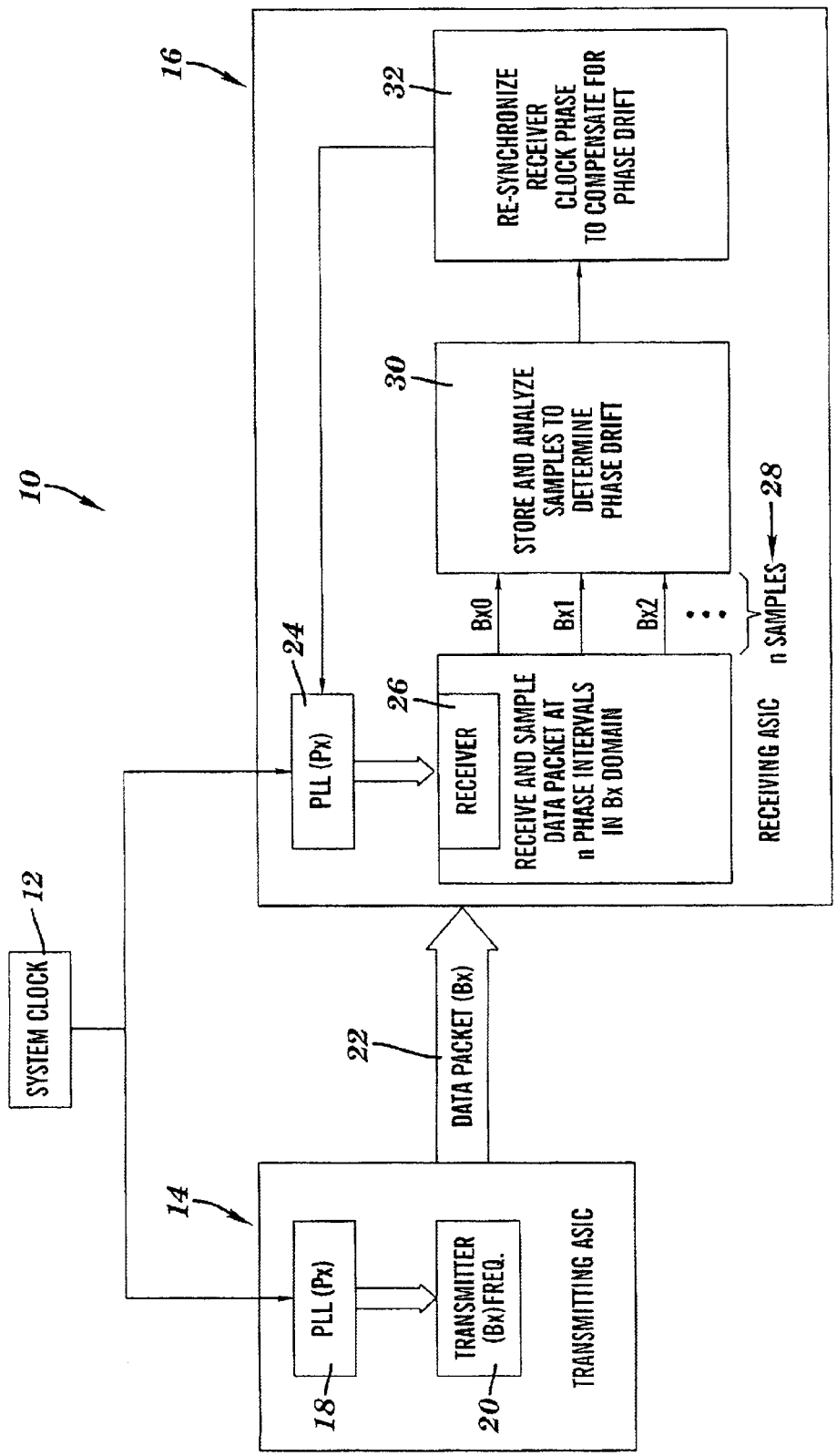
FIG. 1 depicts a high level overview of a high speed communication system in accordance with a preferred embodiment of the present invention.

Referring to FIG. 1, an overview diagram of a high speed serial interface 10 is shown. The system comprises a transmitting ASIC 14, a receiving ASIC 16, and a reference clock 12 that drives both ASICs 14 and 16. Both the transmitting ASIC 14 and the receiving ASIC 16 comprise PLL's 18 and 24 that receive the reference clock signal 12 and allow their respective ASIC devices to operate at some common frequency, Px. Since both PLL's 18 and 24 use the same reference clock, their frequencies will be the same (although not necessarily in phase). The PLL's 18 and 24 also each generate additional clock signals that operate at a frequency of Bx. The specific relationship between Px and Bx is such that $Bx(MHz)=2^{i}*Px(MHZ)$, where $i=\{1, 2, 3, \ldots\}$. The Bx clock is referred to as the bit clock, and is related to the transmitted bit rate in that a new bit of data is transmitted every edge of the Bx clock. The Px clock is referred to as the packet clock, and is related to the data packet transmission rate in that a new data packet is transmitted every rising edge of the Px clock. Specifically, the transmitter 20 therefore includes a Bx clock that allows the transmitting ASIC to transmit $2^{i}$ bits (one per Bx clock edge) during each Px clock cycle. The $2^{i}$ bits of data comprise a data packet 22 that is transmitted from the transmitting ASIC 14 to the receiving ASIC 16. The PLL 24 within the receiving ASIC 16 generates n Bx clocks, each phased spaced within a Bx clock cycle, as well as a receiver Px clock that will ultimately return data to the receiver ASIC 16 logic. Within the receiving ASIC 16, a receiver 26 receives and samples the data packet 22 at each of the n phase intervals in the Bx frequency domain, and on both edges of each n phase interval clocks. The 2n (2 times n) samples 28 are first synchronized to the Bx clock having a phase interval of 0 degrees (referred to as Bx0 clock), and are then stored in a shift register 30 and analyzed to determine an initial phase relationship between the transmitted data packets and the receiver clock and then to subsequently identify transmitter to receiver phase delay drifting. If phase delay drifting has been detected, the receiver can compensate for the phase delay drift by re-synchronizing the received data packets to the receiver clock phase.

Although this preferred embodiment describes an ASIC-to-ASIC data transfer, it is recognized that this system could be implemented within any type of communication system. Although the general relationship between the Bx and Px clocks has been discussed above, throughout the remainder of the discussion a specific Bx:Px frequency relationship of 2:1 will be used. In this context, a data packet will be comprised of four bits, and be referred to as a nibble. Note, however, that while the data packet size described herein is comprised of four bits, it is recognized that larger data packets could be utilized without departing from the scope of the invention.

II. Detailed Description

In discussing the operation of this invention, it is important to note that the transmitting ASIC 14 and receiving ASIC 16 must be initialized through the assertion of a "reset" signal that establishes an initial state for each of the two ASICs. During this initialization phase the PLL used in each ASIC will establish phase and frequency lock to the common reference clock. Since the Px and Bx frequencies will therefore be unstable during this initialization time, it is preferable that the data packets transmitted during this initialization time have a value of "0000." After system initialization, the transmitter ASIC 14 transmits a training sequence. This training sequence is constructed such that three goals are accomplished: (1) it has a deterministic beginning with respect to a transmitter data packet; (2) it has a deterministic end with respect to a transmitted data packet; and (3) back to back bit transitions (e.g., "010" or "101") are embedded within the training sequence to allow individual bit transitions and their relationship to the beginning and end of a data packet to be determined. An example of a training sequence for the case where the Px clock frequency is twice the Bx clock frequency would be "0000,1010,0000." Another example would be "1010,1010,0000." It is an important requirement that the first data transmitted by the transmitter ASIC 14 after system initialization be the training sequence. The last non-zero packet of data sent in the training sequence is referred to as the Training Packet.

As the receiver ASIC 16 receives data, it samples data on both edges of each Bx clock. One way of accomplishing this would be to have two shift registers, one clocked off of the rising edge of the clock, and one off of falling edge of the clock. These two sets of samples are interleaved and stored into a common shift register clocked off of the rising edge of the clock. Note that there is one common shift register per Bx clock. The shift register outputs from the other clocks Bx1, Bx2, . . . , B(x-1) are then synchronized to the Bx0 clock by re-clocking them on the rising edge of the Bx0 clock. This then provides a new history of samples for each of the Bx clocks in the shift register 30 on every rising Bx0 clock edge. Further, any given history is related to the previous or next history by being shifted in position in the shift register 30 by two bits in either direction.

The receiver ASIC 16 then monitors a portion of the shift register 30 contents to determine if the Training Packet is observed within any given Bx0 clock cycle. However, within this clock cycle the Training Packet could have been sampled starting on either the rising or falling edge of the clock. Therefore, there are actually two comparisons performed for each of the Bx clocks. Since the positively and negatively sampled data bits are interleaved within the shift register 30, these two comparisons are performed on two groups of bits each equal in width to the Training Sequence, where the two groups are shifted in position by one bit within the shift register 30. This allows the Training Packet to be observed starting relative to the rising or falling edge of each Bx clock. Note that the requirements outlined above for the selection of the training sequence ensures that the Training Packet cannot be observed starting on both the rising and falling edge of a Bx clock. Another way of stating this is that if the Training Packet is observed in the shift register 30 contents for one of the Bx clocks in one of the two observed positions, it cannot simultaneously be observed in the other.

Once the Training Packet is observed starting on any Bx clock and edge, the receiver ASIC 16 determines what other Bx clock(s) and edge have also observed the Training Packet, thereby providing a distribution of successful comparisons. The center-most comparison within this distribution represents the Bx clock and edge data bit sampling position most centered ID between data transitions (also referred to as being in the center of the data "eye"). In this manner the receiver ASIC 16 establishes an initial phase relationship between the transmitted data and the Bx0 clock. It is possible that data uncertainty due to noise, jitter, or data bit width asymmetry, not all of the Bx clocks will detect the Training Packet (on either edge). However, this condition does not in any way affect the process of determining which Bx clock and edge is best suited for sampling the data since only those comparisons that have detected the Training Packet are used to determine this best fit sampling position.

Since the transmitting ASIC 14 is sending out packets of data having a consistent packet size, the successful observation of the Training Packet also thereby facilitates establishing a phase lock between the transmitted data and the receiver ASIC 16 Bx0 clock. This is accomplished by re-clocking the portion of the shift register 30 where the Training Packet was detected into an output register 32 (also referred to as a "History Buffer") once every n Bx0 clocks, where n is equal to the Bx:Px clock ratio. In other words, all subsequent data packets are retrieved at a rate equivalent to once per Px clock. Once the receiving ASIC 16 has phase locked to the received Training Packet it is said to be in Packet Lock. In an ideal situation, establishing Packet Lock would be a sufficient condition to reliably retrieve subsequent transmitted data packets. However, temperature and voltage variation over time may cause the phase delay from the transmitter ASIC 14 to the receiver ASIC 16 to change from that which existed when initial Packet Lock is established. Therefore a mechanism to allow for phase delay drift detection and correction is necessary to provide a robust solution. This phase delay drift detection is accomplished through a continual process of distributed data packet comparisons similar to those performed in establishing initial Packet Lock. Phase delay correction is accomplished by using to the results of these distributed comparisons to extract a different grouping of bits from the output register 32 to use as the retrieved data packet.

Figure 2:
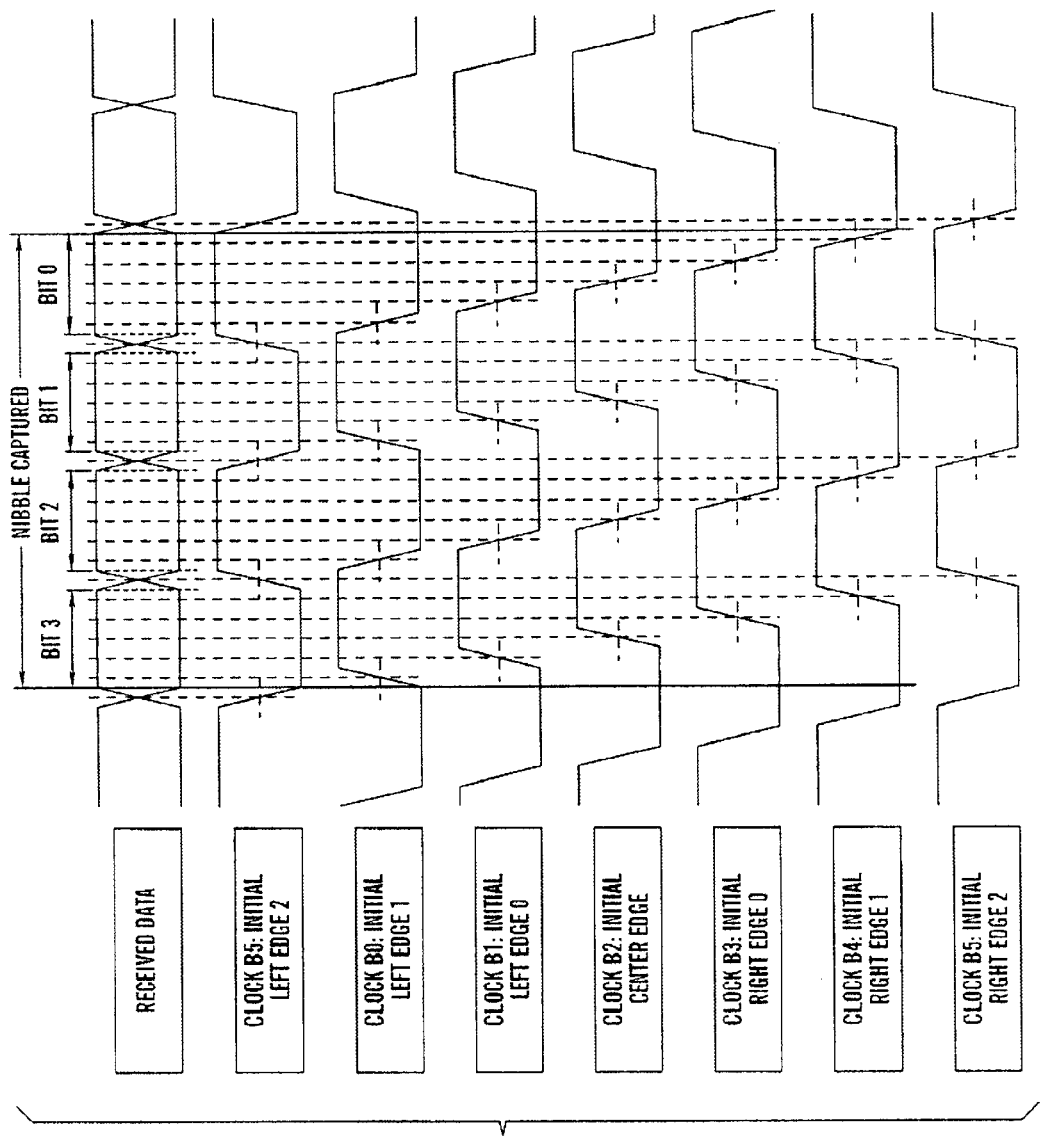
FIG. 2 depicts a timing diagram showing a center edge sampling example in accordance with a preferred embodiment of the present invention.

Phase delay drift detection and correction require that the initial position of the Bx clock edges relative to the Bx clock and edge chosen for initial data sampling (i.e., most in the center of the data eye) be preserved. Referring to this initial data sampling Bx clock and edge as the Initial Center Edge, the remaining Bx clock and edges to the left and right of the Initial Center Edge are also preserved and form a distribution of Initial Left and Right Edges. This is depicted in FIG. 2, where six Bx clocks are used to over-sample the received data and three Initial Right and three Initial Left Edge values are preserved in addition to the Initial Center Edge. Each of these preserved Initial Edge conditions are stored in a respective Edge Counter. As each data packet is received, it is reconstructed from each of the Bx clocks and edges that have had their Initial Center, Left, or Right Bx clock and edge values preserved. For the example shown in FIG. 2, therefore, there would be seven edge counters and six data packets reconstructed in addition to the one reconstructed from the Bx clock and edge chosen for initial data sampling (i.e., the "center" data packet).

Each of these additional six data packets would be compared against the center packet to produce a distributed data packet compare. Within this distributed compare, it is expected that some of the comparisons between the center data packet and those reconstructed from the sampling Bx clock and edges furthest from the center will fail. This may occur because the Bx clock and edges furthest from the center are not reliably sampling the same data packet (i.e., bit for bit) as the center sampling position due to jitter in the received data stream or the Bx clocks sourced from the PLL in the receiver ASIC. In some cases the most outside sampling clock and to edge may just be beyond the boundaries of the respective bit that was sampled by the center Bx clock and edge. However, the sampling Bx clock and edges within a reasonable distance from the center sampling position will, in the absence of excess data jitter, clock jitter, or data duty cycle asymmetry, sample the same data packet as the center sampling position. Further, the characteristics of this distributed compare will be somewhat symmetric about the center sampling position unless some condition has occurred to cause the effective electrical length of the connection between the Transmitter and Receiver ASICs to change from that which existed when initial Packet Lock was established (e.g., temperature or voltage drift). In this condition, the observed distributed compare will be seen to be biased to either the right or left side, indicating that the phase delay of this connection has increased or decreased, respectively.

Figure 3:
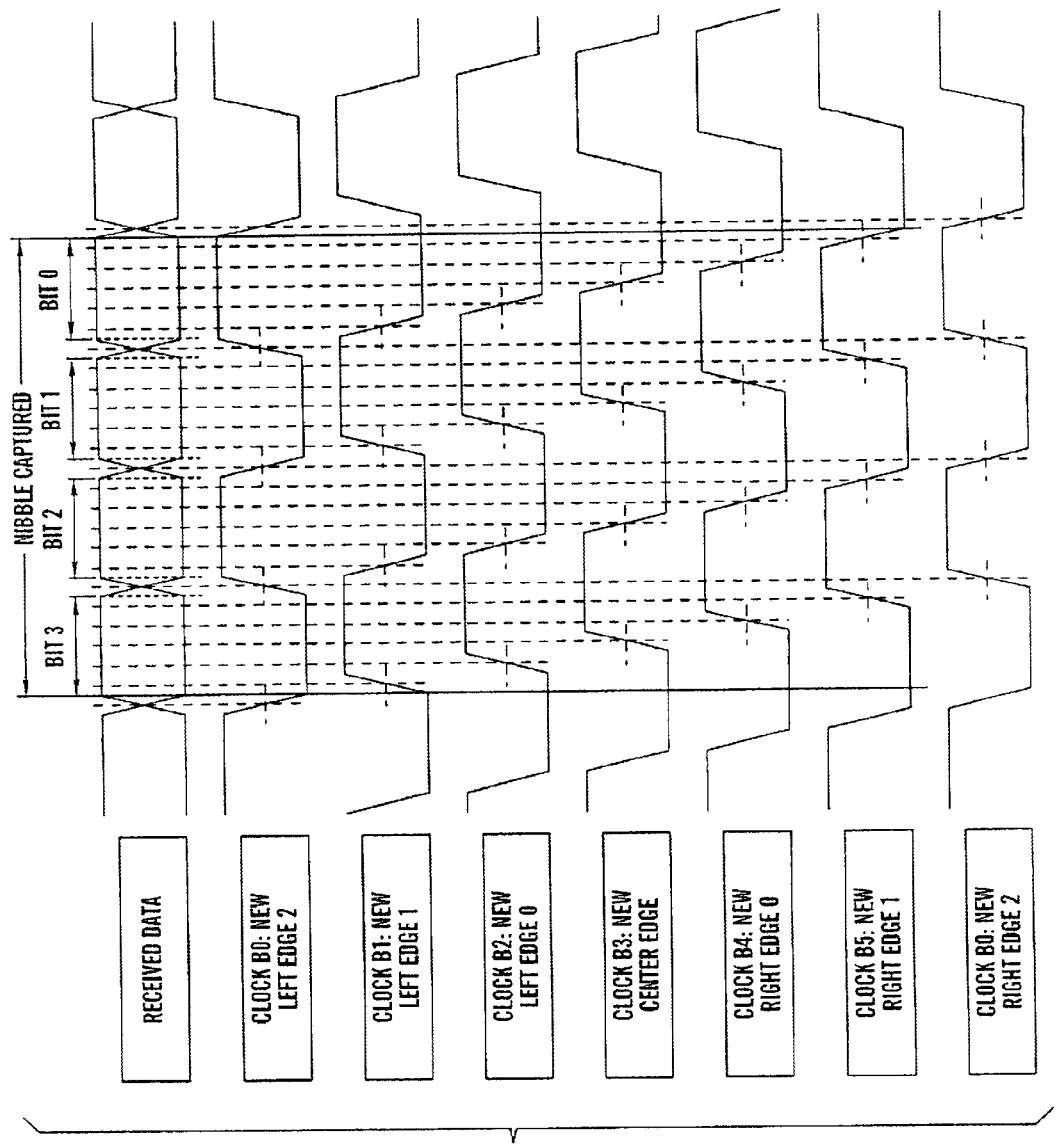
FIG. 3 depicts the timing diagram of FIG. 2 in which the edge counters have been shifted left in accordance with a preferred embodiment of the present invention.

When the distributed comparison is determined to be consistently biased to the left or right, it is an indication that the left or right Bx clock and edge immediately adjacent to the (Initial) center sampling Bx clock and edge is now better suited for sampling future data most in the center of the data eye. Therefore, the Edge Counters are modified from their previous values, and "shifted" left or right to reflect this change. This is depicted in FIG. 3, where the Edge Counters have been shifted left. In this example, the transmitter to receiver phase delay has increased from its original value. Thus the Center Edge Counter will be updated to reflect the Bx clock and edge that was previously stored in the Right Edge Counter, the Left Edge Counter will be updated to reflect the Bx clock and edge that was previously stored in the Center Edge Counter, and so on. In this manner the center sampling position will continue to sample the received data most in the center of the data eye, even though temperature and voltage drift will cause the phase delay of the Transmitter to Receiver connection to change over time.

One of the novel aspects of this invention, therefore, is that phase drift compensation is completely contained within the synchronous system clock (i.e., Px) domain. Absolutely nothing need be done at the receiver interface. Further, since this phase drift compensation is completely contained within the system clock domain, it allows the critical high speed circuitry at the "front" end of the receiver data path to operate consistently at the highest frequency afforded by the process technology. Finally, the ability of this invention to perform its intended function is independent of process, voltage, temperature, or frequency (i.e., aside from the inherent operational frequency limitations of a given process technology). The total amount of phase drift that can be tolerated (and therefore compensated) by a specific implementation is dependent on the depth of data path history preserved within the History Buffer. For every bit earlier or later in time, the phase drift compensation capability is 180 degrees in that direction (since each data path is identical). In the example of a 4 bit nibble, if each data path preserved 6 bits of data, the overall phase drift compensation capability is 180 degrees in either direction from that established at initial nibble lock. To achieve a compensation of 360 degrees in either direction, 8 bits of history must be maintained. Therefore, the "cost" of each additional plus or minus 180 degrees of phase drift compensation is only two bits of history per data path.

The granularity of phase drift compensation is dependent on the number of data paths used. For an implementation of "n" Bx clocks, the phase drift can be compensated for at intervals of 360/(2n) degrees (the factor of 2 comes from the use of both Bx clock edges). For example, if six clocks are used, then the phase drift can be compensated at in interval of 30 degrees in either direction.

In an ideal case, the width of all data bits will be exactly the same. In reality, however, due to imperfections in the Transmitter, Receiver, or Transmitter to Receiver link, the widths of data bits as observed by the Receiver will differ from the ideal. The primary component of this varying data width is duty cycle asymmetry of the Transmitter and Receiver Bx clocks. There is an additional random component of data bit width that is due to the effects of the random nature of the data bit pattern on the physical ASIC I/Os as well as the transport medium. However, the Bx clock duty cycle asymmetry will dominate and therefore the deviation of the data bit width from the ideal will predominantly follow the Bx clock cycle asymmetry. The observed effect of this deviation at the Receiver will be to cause the reliable sample portion of the data bits to be less than the ideal data bit width. However, the mechanism described above for establishing Initial Edge Lock will account for this data bit width asymmetry since only the full Data Training Packet is used in the distributed compare. Since this Training Packet will span several bits (4 for the example used in this discussion), the Bx clock and edge used as the initial sample clock will be the best fit for the center of the narrowest of the data eyes.

Tracking and compensating for varying Transmitter to Receiver phase delay is more difficult when taking duty data bit width asymmetry into consideration. If all data packets (excluding "0000" and "1111", which contain no bit transition information) are used in the distributed compare, there is a potential for the Bx clock and edge used for data sampling to be erroneously positioned. For example, if the received data packet was "1100," the effects of data bit width asymmetry due to Bx clock asymmetry would be undetectable since the received data would be a consistent logic state for a whole Bx clock cycle. Therefore, it is important to restrict the received Data Packets used to perform a distributed compare to those having an embedded back to back bit transition (i.e., a "singled out" bit). For a four bit Data Packet (as in this to example), there are six such nibbles, 0010, 0100, 0101, 1010, 1011, and 1101. This isolates the effects of data bit width asymmetry on the distributed compare to that occurring in a single bit. Therefore any modification required to the Bx clock and edge selected to sample the data will continue to ensure that the data is sampled as close to the center of the data eye as possible.

Another mechanism that may cause the received data bits to randomly vary in phase over time is jitter that occurred either in the PLL clocks or in the transport medium itself. Jitter is defined as the variation in edge positioning (clock or data) that will occur over time due to both random noise events in the system and the non-ideal nature of the PLL due to inherent physical design limitations. The jitter, or amount of variation from the ideal edge positioning, will exhibit a gaussian distribution over time, and has the characteristics that edge to edge jitter will always be less than the total extent of deviation that will ultimately occur over time. Since the probability of edge position deviation in either direction is more or less equal from edge to edge, it is important that the ASIC 16 not respond to jitter by attempting to modify the Bx clock and edge used to sample the data. The mechanism of using full data packets in the distributed compare (and not individual bits in the data stream) effectively implements a low pass filter on the jitter. This ensures that the Receiver 16 will be unresponsive to edge to edge jitter.

The above discussion has focused on the implementation of a single Transmitter to Receiver link. Most applications require more than one link (in fact several). Although many of these applications are only concerned with establishing several ASIC to ASIC links, there is a class of applications that require that the data returned to the Receiver ASIC system logic in a grouping of ASIC to ASIC links be synchronous with the system logic clock. In other words, it is required that the received data in a grouping of links exhibit the same system synchronous nature as the transmitted data from the same grouping of links. This is referred to as "inter-slice skew compensation." For example, in an application that has eight links grouped together, the transmitting ASIC would issue a 32 bit word of data to the eight Transmitters on the same edge of the Px clock. The receiving ASIC should then return the same 32 bit word on a given edge of the receiver ASIC Px clock from the Receivers. If the electrical length of the grouped Transmitter to Receiver links were identical this may occur naturally (since therefore the phase delays of these links would be identical). Ensuring that the electrical lengths of all links are exactly identical, even if possible, is certainly not practical. Even if the electrical length of all the links could be made nearly identical, it would still be very difficult to ensure that all Data Packets in the received word were returned synchronous on the same receiver Px clock edge unless either the Px clock was transmitted along with the data, or there was some mechanism to ensure that the transmitter ASIC Px clock was synchronous to the receiver ASIC Px clock. Actually, even ensuring that the transmitter and receiver Px clocks were synchronous is not a sufficient condition to ensure the synchronous return of the data word. The electrical lengths of the grouped links must also be such that the phase delay of the links ensured that data transitions occurred far enough away from the Px clock edge(s) to eliminate data sampling ambiguity. This sampling ambiguity will occur due to the non-ideal nature of the synchronous relationship of the Px and Bx0 clock due to random factors such as jitter.

Another novel feature of this invention is that it can ensure the synchronous return of all data from all slices on the same system clock edge by using a different portion of each slice's History Buffer to return re-assembled Data Packets to the ASIC system logic. Since the process of re-sampling the data to a common Bx clock (Bx0) assures a relationship of each Data Packet to the rising edge of the Px clock, the observation of the timing relationship of the initially detected Training Packet across all slices can provide an indication of which slices (if any) need to have their returned Data Packets delayed (in units of Px clock cycles) to assure that Data Packets from all slices are returned on the same rising Px clock edge. By noting that a shift in position of two bits in the History Buffer is the same as a delay of one Px clock cycle, it can be seen that the degree of inter-slice skew compensation is directly a function of the depth of the History Buffer. The greater the depth, the greater the degree of compensation.

Finally, it is understood that the systems described herein, including the systems for sampling, comparing, choosing preferred intervals, generating clock signals, storing data, etc., can be implemented with hardware (e.g., logic circuits, memory, execution units, etc.) or software, or a combination of both.

III. EXAMPLE

Figures 4, 5:
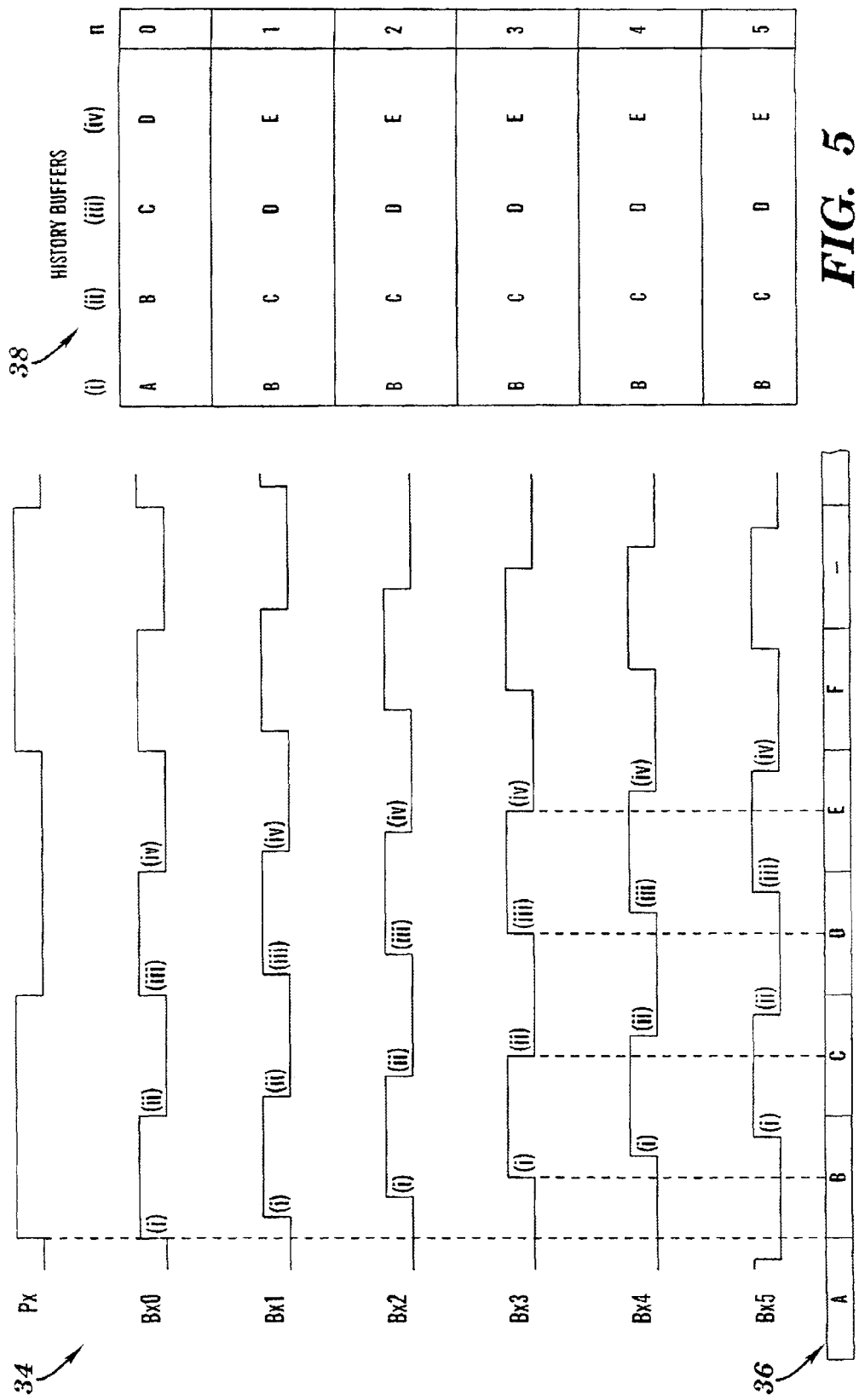
FIG. 4 depicts a timing diagram depicting the sampling of a data packet in accordance with a preferred/embodiment of the present invention.
FIG. 5 depicts the contents of a history buffer resulting from the data sampling of FIG. 4 in accordance with a preferred embodiment of the present invention.

Referring to FIGS. 4–6, a data packet collection scheme pursuant to this invention is depicted that utilizes six Bx clocks and six data paths. In FIG. 4, a timing diagram 34 shows a single Px clock signal (system clock) and six Bx clock signals identified as Bx0, Bx1, Bx2, Bx3, Bx4 and Bx5. As can be seen, each Bx clock is phase shifted by a 30 degree interval relative to the Bx0 clock signal. The phase shift interval for each Bx clock is calculated as $360/(2n)$, where n equals the nth one of the Bx clocks. Also shown is a data packet BCDE embedded within a data stream ABCDEF 36. During operation, the data stream is sampled by each of the Bx clocks on both clock edges at the six phase shift intervals. Accordingly, the data packet BCDE is sampled at each of four edges (i), (ii), (iii) and (iv) for each of the six Bx clocks. Therefore, with respect to the Bx0 clock, it can be seen that at the first edge (i) data bit A is sampled, at the next edge (ii) data bit B is sampled, at the next edge (iii) data bit C is sampled and finally at the fourth edge (iv), data bit D is sampled. This resulting sample is then stored into the n=0 history buffer depicted in FIG. 5. Accordingly, for the Bx0 clock interval, history buffer n=0 captured four bits of data ABCD.

At the subsequent five Bx clock intervals, Bx1, Bx2, Bx3, Bx4, and Bx5, it can be seen that data bit B is sampled at the first edge (i), data bit C is sampled at the second edge (ii), data bit D is sampled at the third edge (iii), and data bit E is sampled at the fourth edge (iv). The results are stored in the respective history buffers (n=1, 2, 3, 4, and 5) shown in FIG. 5.

This technique for collecting data samples along multiple data paths forms the basis for identifying and compensating for phase drift in the following manner. Initially, the system looks for a training sequence or signature data packet in order to provide an initial nibble or phase lock.

For the purposes of this example, it is assumed that the signature data packet is BCDE. As can be seen in FIGS. 4 and 5, the history buffers 38 could be examined to determine which of the n history buffers contain the BCDE signature. In this case, buffers n=1,2,3,4, and 5 each contain the signature data packet. From those buffers that contain the signature, a middle one of the buffers could then be selected to identify the "preferred" phase interval that represents a best fit among all of the six clock intervals. The middle one would typically be used as the preferred phase since it will best represents the center edge, or center of the "data eye." In this case, the Bx3 clock would represent the initial best fit for phase locking. This is evident from FIG. 4, where it can be seen that the edges of the Bx3 clock most closely align with the center of each of the data bits, BCDE. Once the preferred phase interval is identified, the receiver Px system clock could be resynchronized to match the Bx3 clock to establish an initial phase lock.

Once the initial phase lock is established, actual data packets can likewise be loaded into the history buffers 38 and then examined to identify and correct for phase drift. This process would operate as follows. Subsequent data packets received after the initial phase lock would be collected in each of the six history buffers 38 in the same manner as described above. Knowing which one of the n history buffers was previously identified as the best fit, observations regarding neighboring history buffers can be made that will identify phase drift. For example, if during the initial training sequence it was determined that the Bx3 clock was the preferred phase interval for phase locking received data, then the subsequently received and sampled data packet could be examined to see if the n=3 history buffer is still the best choice as the center edge. This is accomplished by comparing the contents of the preferred history buffer (i.e., n=3) with the neighboring history buffers. In this case, the system could look to neighboring buffers that are within two phase shifts to the left or right (i.e., n=1, n=2, n=4, n=5) to determine whether or not phase drifting is occurring. While this particular example identifies the center edge by comparing neighboring buffers that are within two phase shifts to the left or right, it is understood that other methods (e.g., comparing buffers within one phase shift to the left or right) could likewise be implemented.

For example, referring to FIG. 6, a history buffer 40 is depicted which represents the next data packet sampled after the initial training sequence. Assuming that the n=3 history buffer was previously identified as the best initial fit, then it is known that the n=3 buffer contains a valid data packet B'C'D'E'. However, upon examining the neighboring history buffers, namely n=1, n=2, n=4 and n=5, it is evident that the n=3 history buffer may no longer represent the best fit since the n=5 buffer no longer contains a matching data packet. Rather, the center of the data eye has drifted to the n=2 data path, which has neighboring buffers (n=0, n=1, n=3 and n=4) with the same data packet B'C'D'E'. As such, a new preferred data path and clock phase interval is identified as the new best fit. Appropriate modification can accordingly be made.

The foregoing description of the preferred embodiments of the invention have been presented for purposes of illustration and description, they are not intended to be exhaustive or to limit the invention to the precise form disclosed, and obviously many modifications and variations are possible in light of the above teachings. Such modifications and variations that may be apparent to a person skilled in the art are intended to be included within the scope of this invention as defined by the accompanying claims.

What is claimed is:

1. A system for receiving packets of serial data in relation to a system clock having a preselected frequency, comprising:
   a mechanism for sampling each data packet at n clock intervals, wherein each of the n clock intervals is phase shifted in relation to the system clock, and wherein one of the n clock intervals is a preferred interval, and the remaining clock intervals are neighboring intervals; and
   a mechanism for comparing the data packet sampled at the preferred interval with the data packet sampled at each of the neighboring intervals.

2. The system of claim 1, further comprising a mechanism for identifying phase drift based upon a result of the comparing mechanism.

3. The system of claim 1, further comprising a mechanism for identifying one of the n clock intervals as a new preferred interval based upon a result of the comparing mechanism.

4. The system of claim 1, wherein the sampling mechanism comprises a phase lock loop (PLL) that generates n phase shifted clock signals and provides said n clock intervals.

5. The system of claim 4, wherein the n phase shifted clock signals have a frequency of twice the system clock.

6. The system of claim 5, wherein the n phase shifted clock signals are equally spaced throughout a 360 degree clock cycle.

7. The system of claim 1, wherein the preferred interval is synchronized with an edge of the system clock.

8. The system of claim 3, further comprising a mechanism for synchronizing the system clock to the clock interval identified as the new preferred interval.

9. The system of claim 1, further comprising n history buffers for storing each of the n sampled data packets.

10. The system of claim 1, wherein a first subset of the neighboring intervals are received prior in time to the preferred interval, and a second subset of the neighboring intervals are received subsequent in time to the preferred interval.

11. The system of claim 1, further comprising a subsystem for identifying an initial preferred interval, said subsystem having:
    a mechanism for sampling a signature data packet at each of the n clock intervals and storing each in a history buffer; and
    a mechanism for choosing the initial preferred interval by determining which of the history buffers contain the signature data packet.

12. The system of claim 11, wherein the mechanism for choosing the initial preferred interval selects the clock interval corresponding to a middle one of the history buffers that contain the signature data packet.

13. A transmission system for transmitting packets of serial data, comprising:
    a system clock;
    a first integrated circuit (IC) device receiving a reference clock, said first IC comprising:
        means for generating a first internal clock signal from the reference clock, said internal clock signal operating at a predetermined frequency; and
        means for initiating transmission of a data packet during an edge of the internal clock signal; and
    a second IC device also receiving the reference clock, said second IC device comprising:
        means for generating a second internal clock signal from the system clock, said second internal clock signal also operating at the predetermined frequency;
        means for generating n additional clock signals at n distinct clock intervals, each having a frequency of twice the predetermined frequency and each being phase shifted at preselected regular intervals;
        means for receiving and sampling the data packet at each of the n clock intervals, wherein one of the n clock intervals is identified as a preferred interval, and the remaining n clock intervals are identified as neighboring intervals; and
        means for comparing the data packet sampled at the preferred interval with the data packet sampled at each of the neighboring intervals.

14. The transmission system of claim 13, further comprising:
    means for determining a new preferred interval based upon a result of the comparing means.

15. The transmission system of claim 13, further comprising means for identifying an initial preferred interval, said identifying means having:
    means for transmitting a signature data packet from the first IC;
    means for sampling the signature data packet at each of the n clock intervals and storing each in a history buffer; and
    means for choosing the initial preferred interval by determining which of the history buffers contain the signature data packet.

16. A method for overcoming phase drifting at a receiver receiving data from a transmitter, comprising:
    receiving a data packet in a plurality of data paths;
    sampling each data path at a plurality of clock intervals spaced at preselected intervals, wherein one of the data paths is a preferred data path, and a remaining set of data paths are neighboring data paths; and
    comparing data in the preferred data path with data in each of the neighboring data paths.

17. The method of claim 16, wherein the comparing step determines phase drift by examining neighboring data received before and after the preferred data path data.

18. The method of claim 16, wherein the data packet is received at a known frequency.

19. The method of claim 16, further comprising a method of identifying an initial preferred data path, comprising the steps of:
    transmitting a signature to the receiver;
    receiving the signature in the plurality of data paths;
    sampling the signature at the plurality of clock intervals;
    examining each data path to determine which data paths contain the signature; and
    choosing a middle one of the data paths containing the signature as the initial preferred data path.

20. A receiver comprising:
    a system clock;
    a plurality of history buffers for receiving common data and each clocked by one of a plurality of sample clocks spaced at preselected regular intervals in relation to the system clock;
    a monitoring system for monitoring a time relationship between common data received at the history buffers and the system clock;

a determining system for determining which one of the plurality of history buffers receives the common data in a most optimal time relationship with the system clock; and an output system for selectively outputting the common data from one of the history buffers determined by the determining system to be receiving the common data in the most optimal time relationship with the system clock.

21. The receiver according to claim 20, wherein the determining system includes:

a timing system for determining which one of the history buffers sample clock transitions occurs closest to midpoints of its received common data transitions.

22. The receiver according to claim 21, wherein the output means comprises:

a selection system for selectively outputting a succeeding nibble of the common data from another history buffer in response to the determining system determining, during a period of time when a nibble of the common data immediately preceding the succeeding nibble of the common data is being output by the output system, that said another history buffer is receiving the common data in the most optimal time relationship with the system clock compared to said one of the history buffers.

* * * * *

UNITED STATES PATENT AND TRADEMARK OFFICE
CERTIFICATE OF CORRECTION

PATENT NO. : 6,895,062 B1
DATED : May 17, 2005
INVENTOR(S) : Wilson

It is certified that error appears in the above-identified patent and that said Letters Patent is hereby corrected as shown below:

Column 14,
Line 65, delete "a monitoring system" and insert -- a monitoring means --

Column 15,
Line 5, delete "an output system" and insert -- an output means --
Line 11, delete "determining system" and insert -- determining means --
Line 12, delete "a timing system" and insert -- a timing means --

Column 16,
Line 3, delete "a selection system" and insert -- a selection means --
Line 8, delete "output system" and insert -- output means --

Signed and Sealed this

Second Day of August, 2005

JON W. DUDAS
*Director of the United States Patent and Trademark Office*